United States Patent
Yip et al.

(10) Patent No.: US 6,947,380 B1
(45) Date of Patent: Sep. 20, 2005

(54) GUARANTEED BANDWIDTH MECHANISM FOR A TERABIT MULTISERVICE SWITCH

(75) Inventors: Steven Man Pak Yip, Sunnyvale, CA (US); David Anthony Hughes, Palo Alto, CA (US); Yie-Fong Dan, Cupertino, CA (US); Michael T. Chin, Cupertino, CA (US); Raymond Ng, San Francisco, CA (US); Sonny Tran, Fremont, CA (US); Duc Manh Hoang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 09/728,881

(22) Filed: Dec. 1, 2000

(51) Int. Cl.[7] .................... G01R 31/08; G06F 11/00; H04J 1/16; H04J 3/14; H04L 1/00
(52) U.S. Cl. .................... 370/230; 370/235
(58) Field of Search ............... 370/230, 235, 370/230.1, 231, 232, 233, 234, 236, 236.1, 236.2, 237, 395.4, 395.41, 395.42, 395.43, 412, 417, 418, 395.1, 414, 229, 428, 429, 413, 468, 218, 415, 416

(56) References Cited

U.S. PATENT DOCUMENTS

| | | | | |
|---|---|---|---|---|
| 5,313,454 A | * | 5/1994 | Bustini et al. | 370/231 |
| 5,436,891 A | * | 7/1995 | Grossman et al. | 370/231 |
| 5,905,710 A | * | 5/1999 | Nam et al. | 370/231 |
| 6,002,667 A | * | 12/1999 | Manning et al. | 370/232 |
| 6,088,736 A | * | 7/2000 | Manning et al. | 709/234 |
| 6,208,661 B1 | * | 3/2001 | Marshall | 370/412 |
| 6,341,134 B1 | * | 1/2002 | Toutain et al. | 370/412 |
| 6,424,624 B1 | * | 7/2002 | Galand et al. | 370/231 |
| 6,430,191 B1 | * | 8/2002 | Klausmeier et al. | 370/412 |
| 6,445,707 B1 | * | 9/2002 | Iuoras et al. | 370/395.43 |
| 6,512,743 B1 | * | 1/2003 | Fang | 370/232 |
| 6,515,965 B1 | | 2/2003 | Hou et al. | |
| 6,526,062 B1 | * | 2/2003 | Milliken et al. | 370/395.42 |
| 6,654,374 B1 | * | 11/2003 | Fawaz et al. | 370/394 |
| 6,657,962 B1 | * | 12/2003 | Barri et al. | 370/235 |
| 6,661,788 B2 | | 12/2003 | Angle et al. | |
| 6,661,802 B1 | * | 12/2003 | Homberg et al. | 370/412 |
| 6,714,517 B1 | * | 3/2004 | Fawaz et al. | 370/236 |
| 2003/0133406 A1 | * | 7/2003 | Fawaz et al. | 370/229 |

* cited by examiner

Primary Examiner—Wellington Chin
Assistant Examiner—Jamal A. Fox
(74) Attorney, Agent, or Firm—Blakely, Sokoloff, Taylor & Zafman LLP (57) ABSTRACT

A method to guarantee bandwidth for a terabit multiservice switch including receiving control cells indicating that a destination port of an asynchronous transfer mode (ATM) network is congested, and reducing incoming traffic to the congested port to a guaranteed bandwidth of traffic until the destination port is uncongested, is disclosed.

28 Claims, 6 Drawing Sheets

FIG. 6 ered tasks a single destination port, the destination port may become
GUARANTEED BANDWIDTH MECHANISM FOR A TERABIT MULTISERVICE SWITCH

FIELD OF INVENTION

The present invention relates generally to communications systems and, more particularly, to traffic management in a network.

BACKGROUND OF THE INVENTION

An asynchronous transfer mode (ATM) network is designed for transmitting digital information, such as data, video, and voice, at high speed, with low delay, over a telecommunications network. The ATM network includes a number of switching nodes coupled through communication links. In the ATM network, bandwidth capacity is allocated to fixed-sized units of information named "cells." The communication links transport the cells to a destination through the switching nodes. These communication links can support many virtual connections, also named channels, between the switching nodes. The virtual connections ensure the flow and delivery of information contained in the cells to the destination port.

However, if the switching nodes send a lot of traffic to a single destination port, the destination port may become congested. This local congestion of a single destination port may have an effect on the global traffic in the ATM network.

SUMMARY OF THE INVENTION

A method including receiving control cells indicating that a destination port of an asynchronous transfer mode (ATM) network is congested, and reducing incoming traffic to the congested port to a guaranteed bandwidth of traffic until the destination port is uncongested, is disclosed.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A terabit multi-service (TMS) switching platform includes a traffic manager (TM) for a fabric interface chip (FIC) to provide a method and apparatus for guaranteeing bandwidth in a terabit switching platform. In one embodiment, the method includes receiving control cells indicating that a destination port of an asynchronous transfer mode (ATM) network is congested, and reducing incoming traffic to the congested port to a guaranteed bandwidth of traffic until the destination port is uncongested. The TM can provide guaranteed bandwidth even if the line cards and switching fabric are from different vendors.

Figure 1:
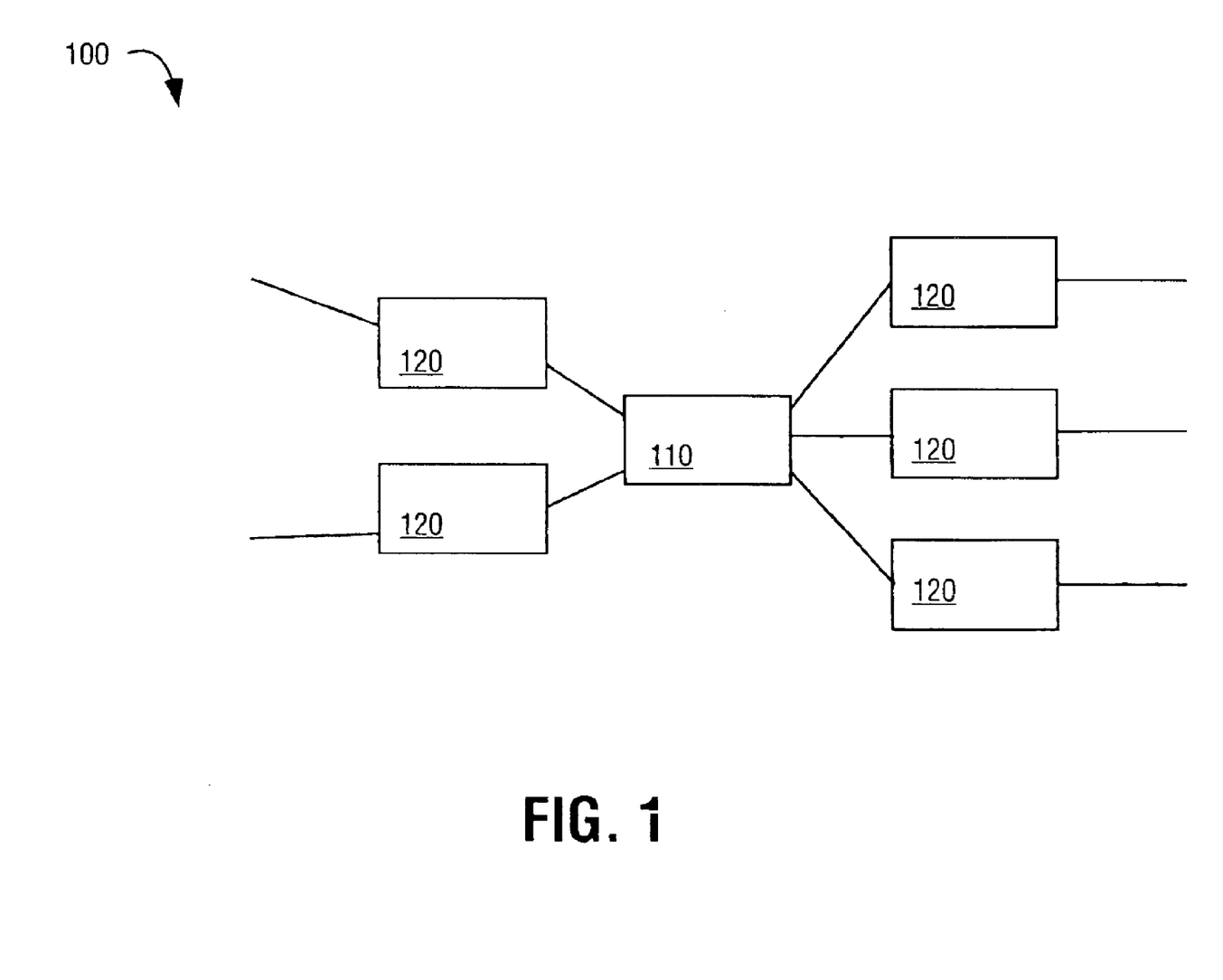
FIG. 1 shows an embodiment of an ATM network.
Figure 2:
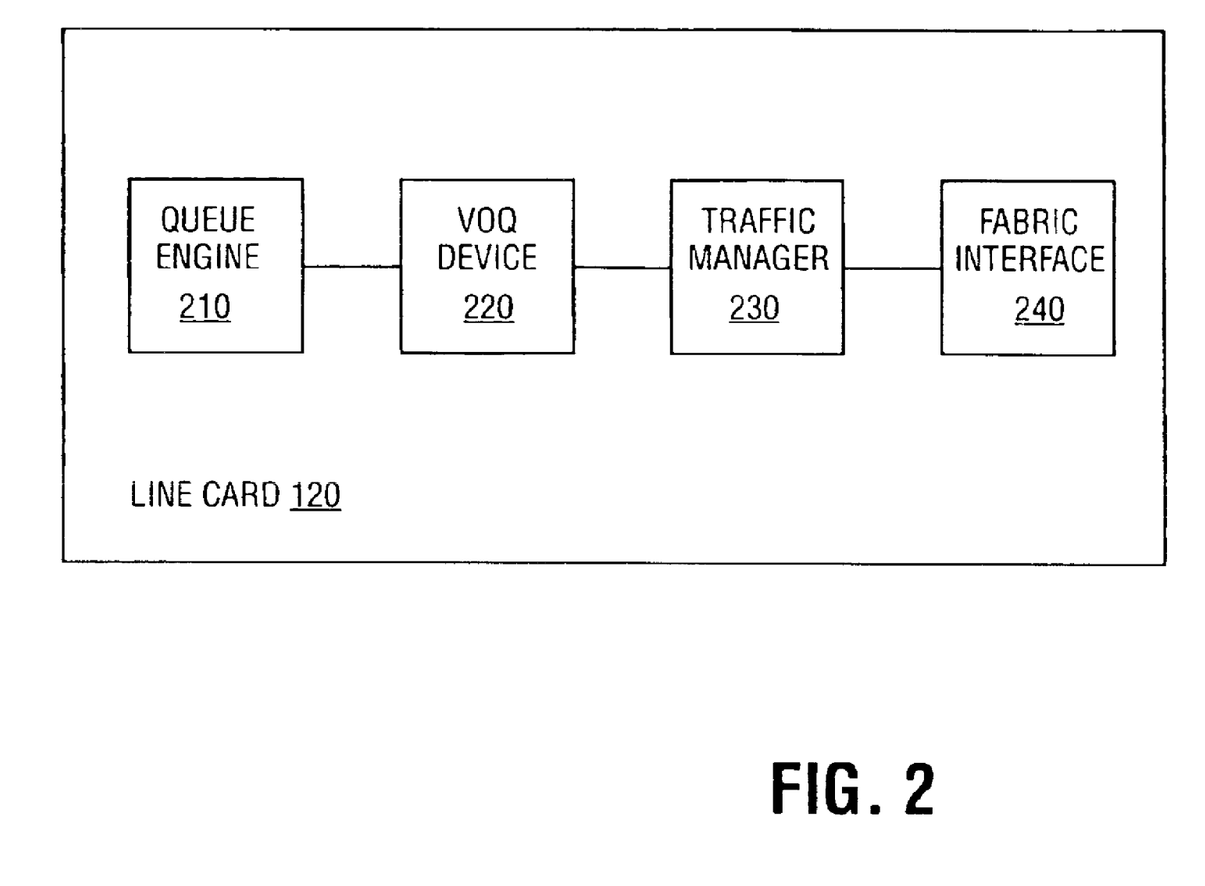
FIG. 2 shows an embodiment of a line card.

FIG. 1 shows an example of an embodiment of a TMS switching platform. Network 100 is a data transmission network with guaranteed bandwidth and quality of service. Data is transmitted through the network in cells. A cell is routed from its source to its destination through switching fabric 110, which contains switching elements (SE). Line cards 120 receive the cells and route the cells to an appropriate destination port through switching fabric 110. FIG. 2 shows an example of an embodiment of line card 120.

For example, as a cell passes from line card 120 to fabric 110, a queue engine 120 in the line card assigns the cell to a virtual output queue (VOQ) in VOQ device 220. The traffic manager (TM) 230 then schedules a departure time for the cell. The cell then passes through the fabric interface (FIC) 240 to switching fabric and then to its destination port.

One function of the traffic manager 230 is to ensure a guaranteed bandwidth for unicast traffic on a port-to-port basis even when the destination port is congested. A congestion happens when multiple ports send more traffic than an optical carrier (OC) at the destination port can handle. For example, a data path from a traffic manager to an OC 192 destination port can only sink data at the OC 192 rate. If the incoming traffic exceeds this rate, then the destination port will be congested.

When globally informed of a congestion at a destination port, each TM in the network immediately rate-limits the traffic destined for the congested port to a guaranteed bandwidth. This guaranteed bandwidth may be pre-determined, using software for example. The guaranteed bandwidth is selected so that the total guaranteed bandwidth allocated to all egress ports for any given destination port does not exceed the rate of the destination port, which may be an OC 192 rate, for example. Otherwise, the oversubscribed traffic will consume the switching element (SE) buffer in the switching fabric, which may be shared among all destination ports. If this happens, it can have a global effect on traffic destined for non-congested ports.

Therefore, in one embodiment, the guaranteed traffic through a destination port is under-subscribed, so that a congestion can be quickly relieved by the extra capacity of the destination port. The ingress traffic management functions of the TM provide this feature. The ingress traffic management functions in a TM manage the flow of unicast, multicast and control cells from a line card to a fabric interface chip (FIC). These functions of the TM may include grant scheduling, backpressure handling, bandwidth allocation, and speedup handling.

Grant Scheduling

The queue engine of a line card send cell counts of its virtual output queues (VOQs) in its VOQ device to the TM in a round-robin fashion. The TM keeps track of these cell counts and uses them to issue grants to non-empty VOQs. The cell count may be carried in an 8-bit field in the request field, to allow a maximum cell count of 255 per VOQ. For example, the grant scheduler of the TM is busy for 8 superframe ticks (16 links×8 cycles=128 grants) before the next cell count update. The TM may issue more grants than the number of cells in a VOQ because of the handshake latency between the VOQ device and the TM. To handle this over-grant scenario, the line card simply drops the grants for empty VOQs and does not flag them as errors. In this embodiment, the grant scheduler may issue a new grant in four clock cycles. For example, given a clock frequency of 125 Mhz, the TM grant scheduler can issue up to 31.25 M grants/sec, which is 20% above the OC192 rate.

Backpressure Handling

The TM receives backpressure information in different forms. An SE in the switching fabric broadcasts per port flow control cells to all ports when the cell count of a congested port exceeds a predefined threshold. The SE also broadcasts emergency flow control cells to all ports when its total buffer utilization exceeds a predefined threshold (the buffer may be shared among the destination port in SE). The FIC can generate separate data and control link backpressure information for TM when one or more of the downstream SEs are congested.

Bandwidth Allocation

Figure 3:
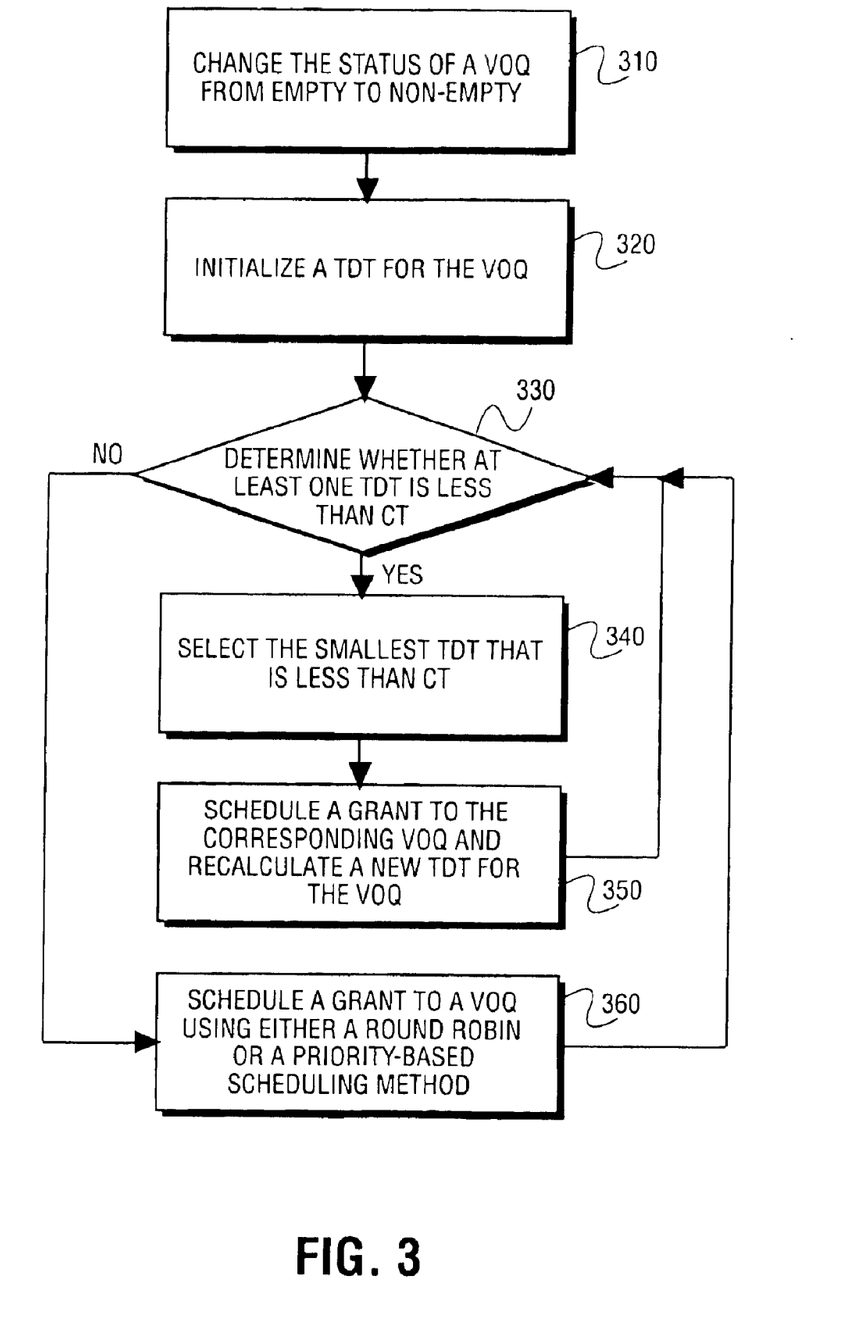
FIG. 3 shows an embodiment of a method for scheduling a grant.

The TM controls the cell flow from the queue engine by rate-limiting the grants issued to all VOQs. In one embodiment, there may be 122 VOQs, including 120 unicast VOQs, 1 multicast VOQ, and 1 control cell VOQ. FIG. 3 shows an embodiment of a method for the grant scheduler to pick a VOQ for the next grant. The current time (CT) is measured by a timer to represent the current time. There is theoretical departure time (TDT) counter and a intercell gap (ICG) counter for each unicast VOQ. The TDT counter defines the next cell's departure time and the intercell gap (ICG) counter defines how much a TDT increments when updated. There may be no TDT and ICG counters associated with the multicast and control cell VOQs.

When the status of a VOQ changes from empty to non-empty, step 310, its TDS is initialized with the current time in the CT, step 320. In the next cell tick, the CT increments by one and the TDT shifts to the left of CT. In each cell tick, the scheduler determines whether a TDT is less then CT, step 330. If so, the scheduler selects the smallest TDT that is less than CT, step 340, and issues a grant to the corresponding VOQ and re-calculates the new TDT based on "new TDT=currentTDT+ICG," step 350. As CT increases with time, the new TDT will be served by the grant scheduler when it becomes the smallest TDT and its value is less than CT.

After the TDTs having values less than CT are served, the scheduler chooses among the VOQs which do not have any pending backpressure, step 360. At this stage, the VOQ selection may be based on either a round-robin method or a priority based method. In the round-robin method, each VOQ is treated equally. In the priority based method, the priorities among the unicast, multicast and control cell VOQs are programmable. However, the round-robin method may be maintained among the unicast VOQs even in the priority based method. In one embodiment, if the scheduler selects a VOQ which already has a future TDT time slot allocated, its TDT will be re-calculated based on the CT (i.e. new TDT=CT+ICG).

Figure 4:
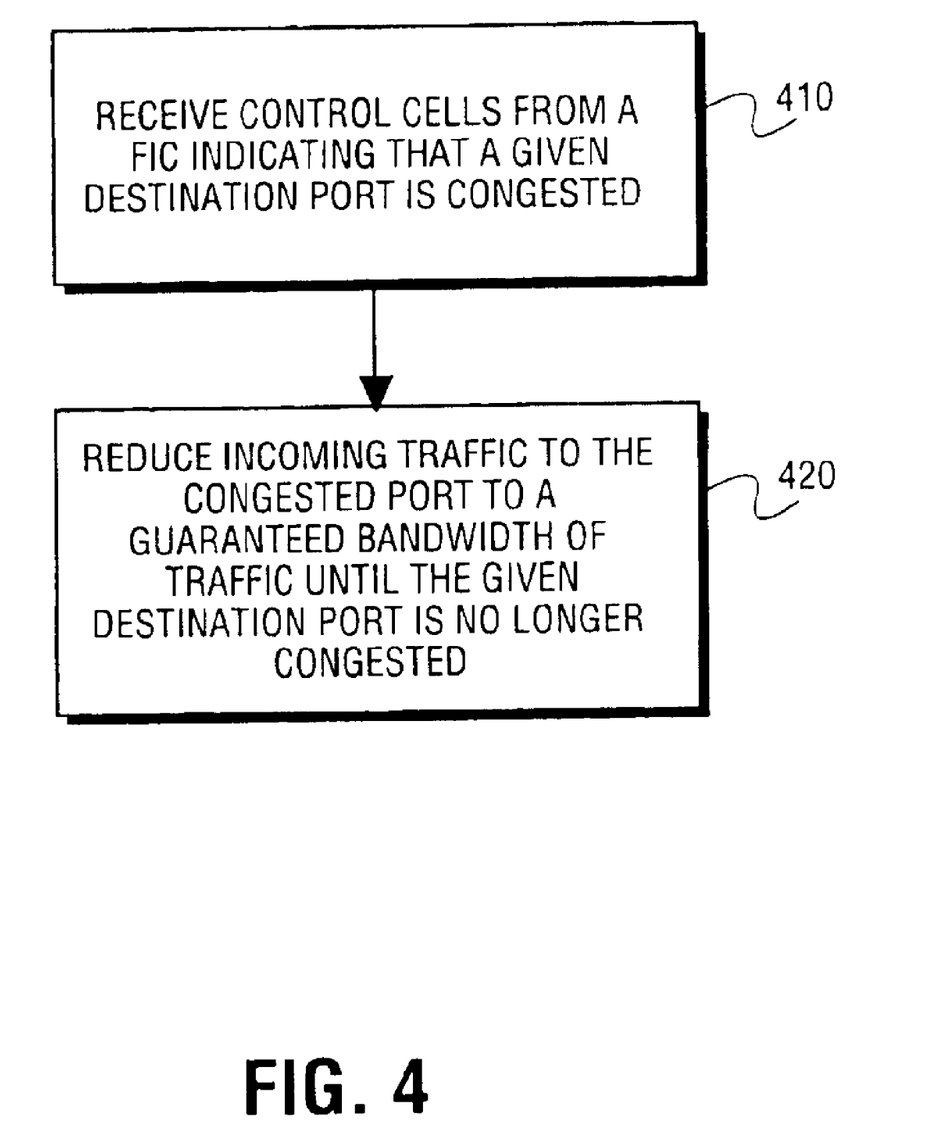
FIG. 4 shows an embodiment of a method for handling backpressure when a destination port is congested.

FIG. 4 shows an example of a method for handling backpressure when a destination port is congested. The TM receives control cells indicating that a destination port is congested, step 410. The incoming traffic to the congested port is reduced to the guaranteed bandwidth, step 420. For example, when either the unicast fifo (first-in, first-out) buffer or the control cell fifo buffer in the TM is filled up due to a data link backpressure from a FIC, the CT stops incrementing and the scheduler stops issuing grants to unicast VOQs in the current cell cycle. Stopping the CT implies the VOQs with guaranteed bandwidth do not gain credit when the data link backpressure is present. The credit may not be supported here because large catch-up traffic may be built up after the link backpressure is removed. The catch-up traffic then has to be treated as guaranteed traffic and can temporarily exceed the guaranteed rate, causing global congestion in the SE.

Multicasts cells received from the VOQ device are put in a multicast fifo buffer before they are duplicated. Copies of the first cell are sent to destination ports which are not backpressured. Head of line (HOL) blocking occurs if at least one destination of the first cell has backpressure. When the multicast fifo buffer in the TM is filled up due to link backpressure or port congestion, no grant is issued to the multicast VOQ in the current cell cycle. If the HOL blocking persists and is not caused by link backpressure, the TM drops the first cell after a timeout period and continuous with the next one.

In one embodiment, cells from the unicast fifo, multicast fifo and control cell fifo buffers may be sent to a FIC in a fixed priority: unicast (highest), control cell and multicast (lowest). The unicast may be given the highest priority because the unicast traffic may have a guaranteed bandwidth. The control cell VOQ may not have a guaranteed bandwidth, but may be traffic small, and can be easily accommodated by the speedup in the VOQ device and FIC interfaces. The multicast cells may be given the lowest priority, so that the additional bandwidth caused by cell duplication does not affect the unicast and control cell traffic. This present the multicast traffic from reducing the speedup advantage in the TM to FIC interface.

Speedup Handling

The speedup information about each VOQ is generated by the line card and is passed to the TM. A speedup flag is on when the throughput of its VOQ drops below a threshold. In the switching fabric, the scheduler may give the highest priority to traffic with speedup. The speedup turns off when the throughput of its VOQ is above a threshold.

In one embodiment, there is no need to speedup traffic because TM performs the bandwidth allocation in its scheduler. However, this raises another issue, fairness. For example, when TM grants 25% guaranteed bandwidth to a VOQ, it does not guarantee that 25% traffic will be constant bit rate (CBR) traffic. CRB traffic supports a constant or guaranteed rate to transport services, such as video or voice, as well as circuit emulation, which require rigorous timing control and performance parameters. If the guaranteed traffic happens to be unspecified bit rate (UBR) traffic, it may be unfair to other VOQs which have non-guaranteed UBR traffic pending. Therefore, the TM should cut back its allocated bandwidth to a VOW if the guaranteed traffic of that VOQ is not entirely CBR traffic.

Figure 5:
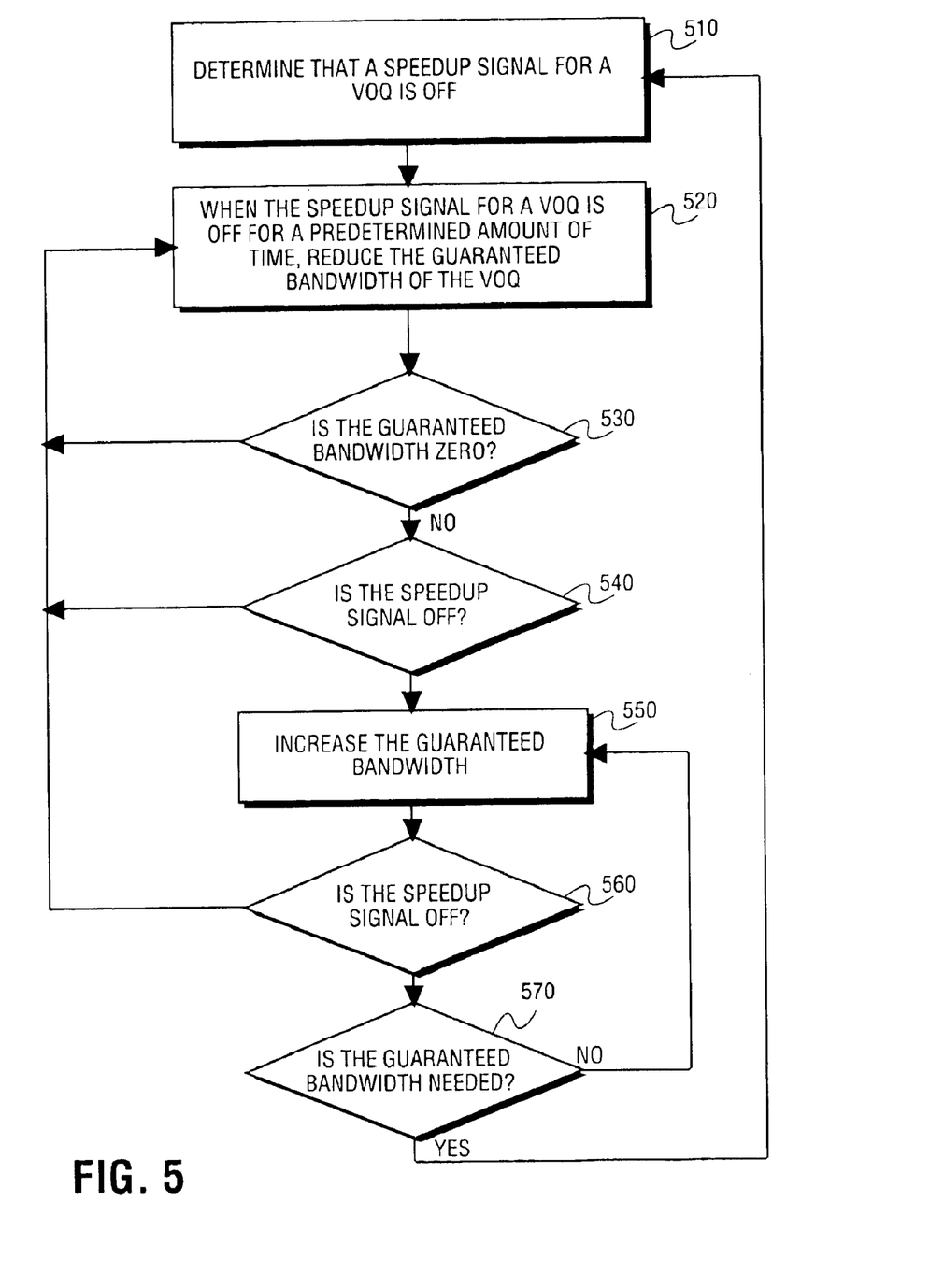
FIG. 5 shows a method for dynamically modifying allocation of bandwidth.

One way to reduce this unfairness is to use the speedup information to dynamically modify the allocation of guaranteed bandwidth for a given VOQ, as shown in FIG. 5. For example, when a speedup signal is off for a VOQ for a predetermined amount of time, step 510 the guaranteed bandwidth of that VOQ will be reduced by a small fixed amount, step 520. This slow downward adjustment continues until either the guaranteed bandwidth drops to zero, step 530 or the speedup signal turns on again, step 540. In this latter case, the guaranteed bandwidth will be incremented by a large fixed amount to ensure it satisfies the traffic demand quickly, step 550. This quick adjustment continues until either the original guaranteed bandwidth is reached step 570, or the speedup signal if off again, step 560.

Figure 6:
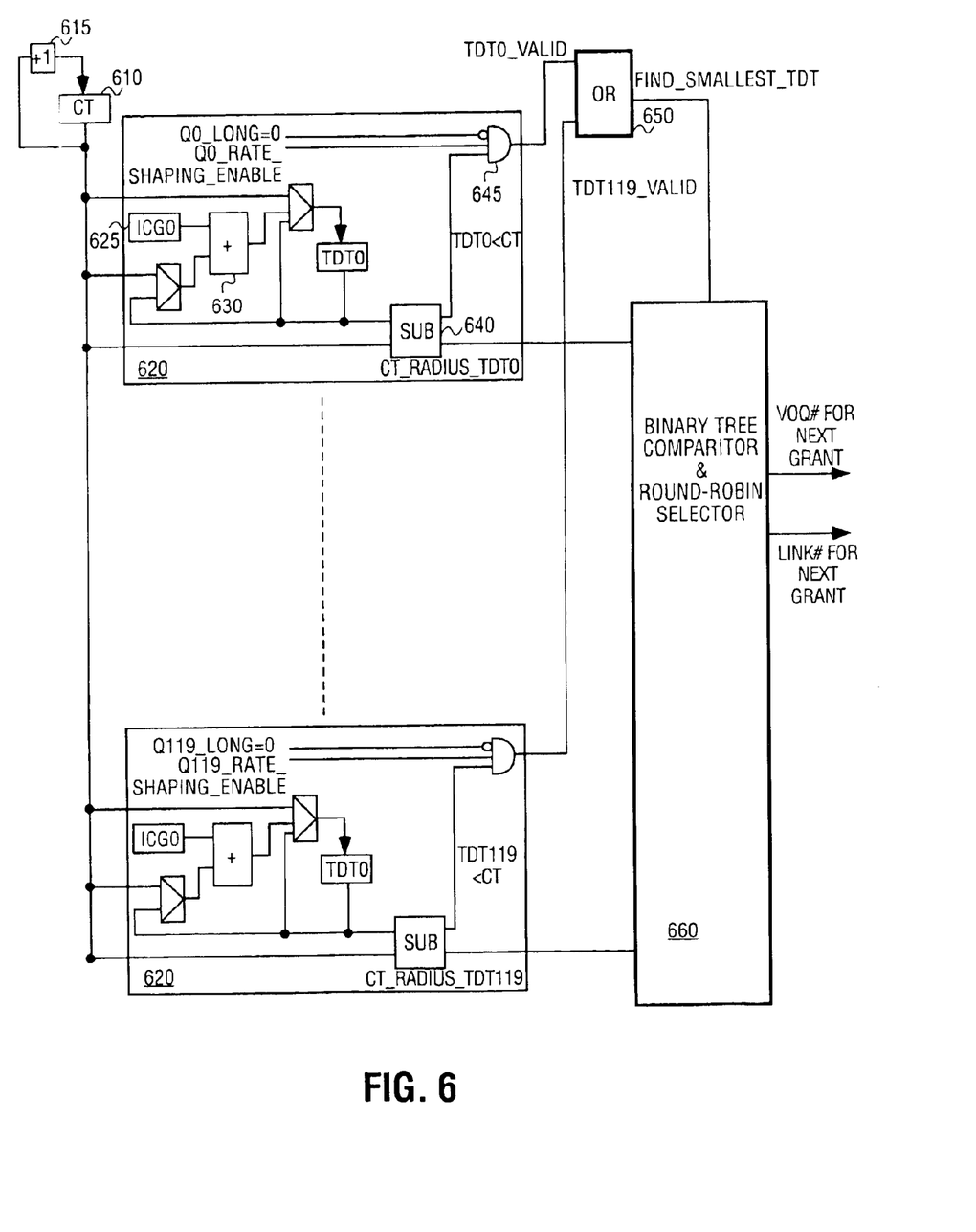
FIG. 6 shows an embodiment of a device for guaranteeing bandwidth.

FIG. 6 shows an example of a device for performing traffic management function. Timer 610 measures the current time and is incremented by pulse device 615. A rate shaping circuit 620 is associated with a corresponding VOQ. ICQ register 625 stores the intercell gap, which may be programmed using software. Adder 630 adds the ICG to the CT and outputs the TDT. Subtractor 640 subtracts the TDT from the CT. If the TDT is less than CT, then a valid signal is output from 645. Circuit 650 receives the valid signals from each rate shaping circuit and finds the VOQ having the smallest TDT. If there is no TDT less than CT, then having the comparator and round robin selector determines the next VOQ and next link to receive the next grant.

These and other embodiments of the present invention may be realized in accordance with these teachings and it should be evident that various modifications and changes may be made in these teachings without departing from the broader spirit and scope of the invention. The specification and drawing are, accordingly, to be regarded in an illustrative rather than restrictive sense and the invention measured only in terms of the claims.

What is claimed is:

1. A method comprising:
  scheduling a grant for a virtual output queue associated with a destination port wherein the virtual output queue having the smallest theoretical departure time is scheduled if the theoretical departure time is less than a current time;
  receiving a message indicating that a destination port of a multiservice network is congested; and
  stopping the increment of the current time to reduce incoming traffic to the congested port to a guaranteed bandwidth of traffic until the destination port is uncongested.

2. The method of claim 1 wherein the network is selected from the group consisting of:
  Asynchronous Transfer Mode (ATM) network, Frame Relay (FR) network, voice network, Circuit Emulation Service (CES) network, and Internet Protocol (IP) network.

3. The method of claim 1, wherein scheduling a grant further comprises scheduling a grant to one of the virtual output queues associated with the congested destination port using either a round robin scheduling method or a priority based scheduling method if no theoretical departure time is less than the current time.

4. An apparatus comprising:
  means for scheduling a grant for a virtual output queue associated with a destination port wherein the virtual output queue having the smallest theoretical departure time is scheduled if the theoretical departure time is less than a current time;
  means for receiving a message indicating that a destination port of a multiservice is congested; and
  means for stopping the increment of the current time to reduce incoming traffic to the congested port to a guaranteed bandwidth of traffic until the destination port is uncongested.

5. The apparatus of claim 4 wherein the network is selected from the group consisting of:
  Asynchronous Transfer Mode (ATM) network, Frame Relay (FR) network, voice network, Circuit Emulation Service (CES) network, and Internet Protocol (IP) network.

6. The apparatus of claim 4, wherein said means for scheduling a grant further comprises means for scheduling a grant to a virtual output queue using either a round robin scheduling method or a priority based scheduling method.

7. A computer readable medium having instructions which, executed by a processing system, cause the system to:
  schedule a grant for a virtual output queue associated with a destination port wherein the virtual output queue having the smallest theoretical departure time is scheduled if the theoretical departure time is less than a current time;
  receive control cells indicating that a destination port of a multiservice network is congested; and
  stop the increment of the current time to reduce incoming traffic to the congested port to a guaranteed bandwidth of traffic until the destination port is uncongested.

8. The medium of claim 7 wherein the network is selected from the group consisting of:
  Asynchronous Transfer Mode (ATM) network, Frame Relay (FR) network, voice network, Circuit Emulation Service (CES) network, and Internet Protocol (IP) network.

9. The medium of claim 7, wherein the executed instructions further cause the system to:
  schedule a grant to a virtual queue using either a round robin scheduling method or a priority based scheduling method if no theoretical departure time is less than the current time.

10. An apparatus comprising:
  a scheduler to schedule a grant for a virtual output queue associated with a destination port wherein the virtual output queue having the smallest theoretical departure time is scheduled if the theoretical departure time is less than a current time;
  a receiver to receive a message indicating that a destination port of a multiservice network is congested; and
  a traffic manager to stop the increment of the current time to reduce incoming traffic to the congested port to a guaranteed bandwidth of traffic until the destination port is uncongested.

11. The apparatus of claim 10 wherein the network is selected from the group consisting of:
  Asynchronous Transfer Mode (ATM) network, Frame Relay (FR) network, voice network, Circuit Emulation Service (CES) network, and Internet Protocol (IP) network.

12. The method of claim 1, further comprising:
  selecting a guaranteed bandwidth of traffic for the virtual output queue;
  reducing the guaranteed bandwidth when a speedup for the virtual output queue is off for a predetermined amount of time, wherein reducing the guaranteed bandwidth continues until the guaranteed bandwidth is zero or the speedup signal is on; and
  rate-limiting traffic of the virtual output queue to the guaranteed bandwidth until the destination port is uncongested.

13. The method of claim 12, wherein reducing the guaranteed bandwidth further comprises reducing the guaranteed bandwidth by a small fixed amount.

14. The method of claim 13, further comprising increasing the guaranteed bandwidth if the speedup signal is on and the guaranteed bandwidth is less than what was originally selected.

15. The method of claim 14, wherein increasing the guaranteed bandwidth further comprises increasing the guaranteed bandwidth by a large fixed amount.

16. The apparatus of claim 4, further comprising:
  means for selecting a guaranteed bandwidth of traffic for the virtual output queue;
  means for reducing the guaranteed bandwidth when a speedup signal for the virtual output queue is off for a predetermined amount of time, wherein reducing the guaranteed bandwidth continues until the guaranteed bandwidth is zero or the speedup signal is on; and means for rate-limiting traffic of the virtual output queue to the guaranteed bandwidth until the destination port is uncongested.

17. The apparatus of claim 16, wherein means for reducing the guaranteed bandwidth further comprises means for reducing the guaranteed bandwidth by a small fixed amount.

18. The apparatus of claim 17, further comprising means for increasing the guaranteed bandwidth if the speedup signal is on and the guaranteed bandwidth is less than what was originally selected.

19. The apparatus of claim 18, wherein means for increasing the guaranteed bandwidth further comprises means for increasing the guaranteed bandwidth by a large fixed amount.

20. The medium of claim 7, wherein the executed instructions further cause the system to:

select a guaranteed bandwidth of traffic for the virtual output queue;

reduce the guaranteed bandwidth when a speedup signal for the virtual output queue is off for a predetermined amount of time, wherein reducing the guaranteed bandwidth continues until the guaranteed bandwidth is zero or the speedup signal is on; and rate-limit traffic of the virtual output queue to the guaranteed bandwidth until the destination port is uncongested.

21. The medium of claim 20, wherein the guaranteed bandwidth is reduced by a small fixed amount.

22. The medium of claim 21, wherein the executed instructions further cause the system to increase the guaranteed bandwidth if the speedup signal is on and the guaranteed bandwidth is less than what was originally selected.

23. The medium of claim 22, wherein the guaranteed bandwidth is increased by a large fixed amount.

24. The apparatus of claim 10 wherein the scheduler is further to schedule a grant to one of the virtual output queues associated with the congested destination port using either a round robin scheduling method or a priority based scheduling method if no theoretical departure time is less than the current time.

25. The apparatus of claim 10, wherein the traffic manager is further:

to select a guaranteed bandwidth of traffic for the virtual output queue;

to reduce the guaranteed bandwidth when a speedup signal for the virtual output queue is off for a predetermined amount of time, wherein reducing the guaranteed bandwidth continues until the guaranteed bandwidth is zero or the speedup signal is on; and to rate-limit traffic of the virtual output queue to the guaranteed bandwidth until the destination port is uncongested.

26. The apparatus of claim 25, wherein the traffic manager is further to reduce the guaranteed bandwidth by a small fixed amount.

27. The apparatus of claim 26, the traffic manager is further to increase the guaranteed bandwidth if the speedup signal is on and the guaranteed bandwidth is less than what was originally selected.

28. The apparatus of claim 27, wherein the traffic manager is further to increase the guaranteed bandwidth by a large fixed amount.

* * * * *